United States Patent Office 3,578,446
Patented May 11, 1971

3,578,446
ELECTROPHOTOGRAPHIC REPRODUCTION EMPLOYING BI-CHARGING AND NEGATIVE-CHARGING ZINC OXIDE
Meyer L. Sugarman, Northbrook, Ill., assignor to The Firestone Tire & Rubber Company, Akron, Ohio
No Drawing. Filed July 26, 1967, Ser. No. 657,471
Int. Cl. G03g 5/00
U.S. Cl. 96—1.8                                           4 Claims

ABSTRACT OF THE DISCLOSURE

Direct electrostatic duplication processes are often plagued with problems of background printing. The inclusion of bi-charging zinc oxide, and/or of polyvinyl alchohol in the coating composition applied to the paper or other substrate will greatly reduce this problem.

This invention relates to coatings for papers and other substrates to be used in direct electrostatic duplication processes and in particular to a method for minimizing print background without loss in image density in such duplication processes operating at optimum exposure.

The papers employed in commercial electrophotographic processes are coated with zinc oxide as a photoconducting material. The finely divided zinc oxide is normally held on the paper by a suitable resin binder such as silicone resins, polystyrene, butadiene copolymers and the like. Of primary interest in this regard are the water-based latices, and particularly butadienestyrene interpolymer latices. Coating materials of this type are described in detail in Edris Pat. U.S. 3,291,767.

In general, the coating contains dyes that sensitize the zinc oxide to visible light. Typical dyes include Rhodamine B and the Rhodamine B family of dyes.

The coated paper is given a negative charge as, for example, by corona discharge. It is then exposed to the image of the document to be copied through appropriate systems of lenses, etc. Light from the non-image areas causes the charge on the paper to dissipate in corresponding areas, leaving on the paper an electrostatic pattern that duplicates the image of the original. The paper may then be developed by dry means, e.g., by passing pigmented powders over the surface of the charged paper, or by liquid means, e.g., by passing a suitable organic liquid having pigment particles suspended therein over the surface of the charged paper. In both cases, the pigment particles cling to the charged areas of the paper by electrostatic attraction; a few seconds of heating fuses the resin binder causing the powder to adhere permanently to the paper.

A major problem associated with such processes is the formation of a background image on the printed copy. Background printing in the non-image area greatly reduces the readability of the copies and renders them unsatisfactory for most use. The apperance of the copy is, of course, also unsatisfactory. Many techniques have been tried in attempts to overcome this problem. In general, however, these have not met with significant commercial success.

High purity zinc oxide of the type employed in the coating of electrophotographic papers is characterised by its capability of accepting and holding negative electrostatic charges. The common commercial grade of zinc oxide of this type is often referred to as "French process zinc oxide pigment." A negative electrostatic charge is normally acquired when the pigment is exposed to corona, ultraviolet or deep blue light. The pigment tends to be insensitive to other components of visible light and does not accept significant positive electrostatic charge under any type of light. For the purposes of this disclosure, such zinc oxide will be designated as "negative-charging zinc oxide." Normally, the weight ratio of pigment to binder (resin or latex solids) can range from about 1:1 to about 10:1. Preferably, the ratio is in the range of about 2:1 to about 7:1.

It has now been found that by substituting a substantial amount of bi-charging zinc oxide for the negative-charging zinc oxide in the paper coating, a significant improvement is obtained in the quality of the final print with background printing minimized without significant adverse affect on either charge acceptance or image density.

It has further been found that the inclusion of minor amounts of polyvinyl alcohol in the resin coating very significantly reduces the amount of toner background and provides an improved product. This reduction in toner background can be obtained without serious reduction in the speed of the final coated paper.

It has also been found that the substitution of a substantial amount of bi-charging zinc oxide for the the negative-charging zinc oxide in the paper coating and the incorporation in the resin latex of a minor amount of polyvinyl alcohol still further enhances the characteristics of the coating composition which, when applied to a suitable substrate, provides a coated electrophotographic substrate which can be employed with excellent contrast and image density and with very greatly reduced background or toner printing and without serious reduction in the speed of the final coated paper. Thus, while using either of the above-described improvements independently will provide a substantial improvement in the ultimate duplication paper, such paper still may, in some instances, be of marginal acceptability. When both of the above-described improvements are combined in a single coating composition, the ultimate duplication paper is of consistently high quality and acceptability.

USE OF BI-CHARGING ZINC OXIDE

As employed herein, the term "bi-charging zinc oxide" is employed to designate materials which consist predominantly of zinc oxide, but which are capable of accepting both positive and negative charges. One such material is described in U.S. Pat. 3,060,134. As is noted therein, the pigment particles appear to consist of a core of substantially pure crystalline zinc oxide with adjoining surface layers of a complex of zinc oxide and zinc sulfide; the overall product is a heterogeneous complex of zinc oxide and zinc sulfide. The details for making such a product are also described in the above-mentioned patent.

It is not entirely understood in what manner the bi-charging zinc oxide reduces background. It is believed to be effective, however, by virtue of its acceptance of a positive charge from the positive corona unit used as the opposite half of the normal double corona charging unit employed in most electrophtographic copying devices. The positively-charged particles, interspersed with the normally negatively-charged photoconductive particles which accomplish the basic charge dissipation function, furnish a powerful area of opposite charge acceptance to which the negative charges dissipated by light may migrate. This, in turn, lowers the residual voltage in exposed areas of the print to a potential below that which will attract appreciable amounts of toner from the liquid suspension medium. It is to be recognized that this is merely applicant's belief, however, and does not necessarily explain all of the desirable properties resulting when a substantial amount of the normally negative-charging zinc oxide is replaced by bi-charging zinc oxide.

In testing the effect of the two types of zinc oxide in the coating composition, two resin master batches were prepared in the following manner:

To 65 ml. of deionized water, 16 drops of a 10% Tamol 850 dispersant solution (sodium salt of a carboxylated polyelectroylte) were added. One hundred and twenty grams of zinc oxide were slowly added in a high speed dispersion mixer (Cowles dissolver). When the zinc oxide was well dispersed, 3.6 ml. of a 0.5% of Rhodamine B dye in ethanol were added to it. This pigment/dye mix was then added to 75 grams (wet weight, approximately 27.5 grams of solids) of latex of a 58% styrene/34% butadiene/8% shellac interpolymer (produced according to the technique described in U.S. Pat. No. 3,291,767), and agitated mildly until uniform.

In the first such master batch, the zinc oxide was a French process zinc oxide which is negatively-charging and identified commercially as Photox. In the second master batch, the zinc oxide was bi-charging zinc oxide of the type described in U.S. Pat. 3,060,134. The two master batches were then mixed in various proportions to provide coating compositions containing varying percentages of negative-charging zinc oxide and bicharging zinc oxide. The various coating compositions were then drawn onto 13 pound bond paper using a standard wire-wound coating rod. The coated paper was immediately placed under infra-red lights for 20 seconds for drying. Coating weights were calculated by weighing coated and uncoated paper.

In the example, the following tests were employed to evaluate the coatings:

Charge acceptance (initial potential): the apparent surface voltage present on an electrostatic recording medium immediately after charging. When the photoconductive coating is exposed to light it picks up an electrostatic charge of some magnitude. It is claimed by some that a minimum charge acceptance of 300 volts is required for office copying purposes. Generally the higher the charge acceptance, the better the print quality of the coating.

To measure charge acceptance, one mounts the coated paper under the probe of an electrometer in a dark room. The specimen is then exposed to light and the instantaneous electrometer reading is recorded as charge acceptance.

Light decay: a measure of charge loss from the coated paper at any given time interval, i.e. 20 seconds, 40 seconds, etc. due to exposure to light. This is measured on the electrometer in the same way as charge acceptance except the reading after a period of time (e.g., 20 seconds) is taken.

If the light decay rate is too fast by the time the charged paper reaches the developer solution in the copying machine the charge may be so low it does not attract enough oppositely charged pigment to provide a distinct print. If the light decay rate is too slow, the paper may pick up excess developer resulting in prints with heavy background. Light decay rates of 10–20 volts v./f.c.s. are considered satisfactory.

Time to 20 volts: This measurement is related to light decay rate and in essence is the number of seconds it takes for the coated paper, when exposed to light, to reduce its charge from the original value (charge acceptance) to 20 volts. This is run on the electrometer in the same way that light decay is determined.

The above techniques were employed in the examples which follow:

EXAMPLE 1

As a control example, paper was coated with a coating formulation containing only the negative charging zinc oxide. The coating was applied in an amount corresponding to 25 lbs. per ream. The coated paper was found to have a charge acceptance of 480 volts, a maximum light decay of 20 v./f.c.s. with a time to 20 volts of 10.6 seconds. When prints were made on the paper, very bad toner background was obtained with very little contrast.

EXAMPLE 2

Example 1 was repeated except that 25% of the zinc oxide was replaced by bi-charging zinc oxide. The coating was applied in an amount of 26½ lbs. per ream. The charge acceptance was 485 volts, the maximum light decay was 17 v./f.c.s. and the time to 20 volts was 12.4 seconds. Prints produced with this paper exhibited significantly reduced toner background and improved contrast.

EXAMPLE 3

Example 1 was repeated except that 50% of the zinc oxide was replaced by bi-charging zinc oxide. The coating was applied in an amount of 22 lbs. per ream. The coated paper had a charge acceptance of 475 volts, a maximum light decay of 17 v./f.c.s. and a time to 20 volts of 10.8 seconds. Prints made on this paper exhibited still less toner background than found in either Examples 1 or 2 and contrast and readability were good.

EXAMPLE 4

Example 1 was repeated except that 75% of the zinc oxide was replaced by bi-charging zinc oxide. The coating was applied in an amount of 24½ lbs. per ream of paper. The coated paper had a charge acceptance of 450 volts, a maximum light decay of 14 v./f.c.s. and a time to 20 volts of 11.8 seconds. The toner background on the printed paper was very much less than for Example 1, less than for Example 2, but somewhat more than Example 3. The contrast was good.

EXAMPLE 5

Example 1 was reepated except that in this instance all of the zinc oxide was of the bi-charge type. A heavy but uniform toner background resulted and there was a reduction in contrast. The paper had been coated in an amount of 24½ lbs. of coating per ream. The charge acceptance of the paper was 500 volts, the maximum light decay 12 v./f.c.s. and the time to 20 volts was 18.7 seconds.

As will be seen from the foregoing examples, the inclusion of a substantial amount of bi-charging zinc oxide with the standard zinc oxide in coatings for electrophotographic coatings tends to reduce the amount of toner background obtained during use of the coated paper. In general, at least about 15% of the zinc oxide should be replaced by the bi-charging zinc oxide, with the greatest improvement resulting when the amount of bi-charging zinc oxide exceeds 25%. At about 75% bi-charging zinc oxide, the desirable properties fall off sharply. Particularly superior properties are obtained in the vicinity of 50% bi-charging zinc oxide—50% negative-charging zinc oxide.

While in the foregoing examples the resin coating was a water-based latex of butadiene, styrene and shellac interpolymer, the invention is not so limited. Any of polymeric coating composition free of soap-type emulsifiers may be improved by the method of the present invention.

These coating compositions are known to the art and include polymers produced from one or more of the following: styrene; vinyl monomers such as vinyl acetate, vinyl chloride and vinyl cyanide (acrylonitrile); unsaturated acids such as acrylic acid, methacrylic acid and crotonic acid; esters of unsaturated acids including alkyl acrylates and methacrylates such as ethyl acrylate, octyl acrylate, methyl methacrylate and alkyl fumarates such as dibutyl fumarate; and the dienes, particularly the conjugated dienes such as butadiene. Typical soap free emulsions include, therefore, not only the styrene-butadiene type polymers but also aqueous latices such as, for example, 65% vinyl chloride-30% octyl acrylate-5% acrylic acid polymer; 55% styrene-45% dibutyl fumarate-5% methacrylic acid polymer; and 50% ethyl acrylate-45% methyl methacrylate-5% acrylic acid polymer. Further, butadiene-styrene interpolymers with acrylamide and/or acrylic acid (as copolymerizable emulsifier) can be successfully employed in latices for the purposes of the present invention.

In addition to the foregoing emulsions, various polymer solutions can be employed herein. Thus, for example, a 95% vinyl acetate-5% crotonic acid copolymer dissolved at 30% solids in toluene provides a system which can be employed with the present invention to produce an improved coating. Compositions comprising 50% styrenepounded with polyvinyl alcohol as follows: Various grades of polyvinyl alcohol were prepared as 10% by weight solutions in distilled water and added to the coating mixture at the given percentage (percent solid polyvinyl alcohol based on polymer-S/B latex-solids). These coating compositions were then applied to paper in the manner previously described and tested. The results are found in Table I.

TABLE I

| Polyvinyl alcohol characteristics | | Coating characteristics | | | |
|---|---|---|---|---|---|
| Viscosity | Degree of hydrolysis, percent | Percent used | Charge acceptance, volts | Light decay, v./f.c.s. | Print background | Coating weight |
| Low | 88 | 1.0 | 310 | 6.0 | Fair-poor | 14.7 |
| Low | 99 | 1.0 | 360 | 12.0 | ____do____ | 21.6 |
| Medium | 99 | 1.0 | 390 | 16.0 | Fair | 23.4 |
| High | 97 | 1.0 | 420 | 12.0 | Good | 23.4 |
| Do | 99 | 1.0 | 470 | 14.0 | ____do____ | 24.6 |
| Do | 45 | 1.0 | 220 | 16.0 | Poor | 21.9 |
| Do | 99 | 0.25 | 430 | 15.0 | Good | 22.2 |
| Do | 99 | 0.50 | 450 | 14.0 | ____do____ | 21.9 |
| Do | 99 | 0.75 | 470 | 16.0 | ____do____ | 24.2 |
| Do | 99 | 1.25 | 470 | 16.0 | ____do____ | 21.6 |
| Do | 99 | 1.50 | 380 | 12.0 | Fair | 20.3 |
| | | 0 | 480 | 20.0 | Poor | 25.0 |

50% butadiene dry rubber dissolved at 25% solids in toluene, 30% acrylonitrile-70% butadiene dry rubber dissolved at 25% solids in methyl ethyl ketone and hydroxylated vinyl chloride polymer (e.g., 91% vinyl chlorides units, 3% vinyl acetate units, and 6% vinyl alcohol units) dissolved at 25% solids in methyl ethyl ketone are also useful for the purposes of the present invention. It is to be understood that the specific percentage and solvent are illustrative and not limiting since a great amount of variation is possible in the coating compositions.

USE OF POLYVINYL ALCOHOL

It has been found that the use of polyvinyl alcohol in the coatings of the present invention is critically limited to specific types of polymer latices. In particular, polyvinyl alcohol has been found to give an improved product only when incorporated in aqueous latex coating compositions which are essentially free of soap-type emulsifiers. Thus, for example, butadiene-styrene-shellac types interpolymers such as those described in Edris Pat. 3,291,767 have been found to be quite useful for the purposes of the present invention. Similarly, the butadiene-styrene interpolymers employing acrylamide and/or acrylic acid as the emulsifier have been found to be improved as an electrophotographic coating composition when minor amounts of polyvinyl alcohol are incorporated in the coating. The other, previously described water-based latices are also improved by the addition of polyvinyl alcohol.

It is not clearly understood why the inclusion of polyvinyl alcohol in the coating composition reduces the tendency for toner background. It is believed, however, that the polyvinyl alcohol acts as a "conductivity bridge" between the latex particles and the zinc oxide particles, thus providing a better path for charge dissipation and permitting more efficient charge drainage upon the action of light on the sensitized zinc oxide particles.

The polyvinyl alcohol is generally introduced into the latex coating composition as an aqueous solution. It has been found that the so-called high viscosity polyvinyl alcohol, particularly the fully hydrolyzed alcohol, is very much preferred over the low viscosity polyvinyl alcohols. For the purpose of this disclosure, "high viscosity" refers to a viscosity in the range of about 35 to 65 centipoises, "medium viscosity" ranges from about 21 centipoises up to about 35 centipoises and "low viscosity" is less than medium viscosity. All of the viscosity values herein for polyvinyl alcohol represent the viscosity of a 4% water solution at 20° C. (as measured by the Hoeppler falling ball method.).

EXAMPLES 6 THROUGH 17

The electrophotographic coating prepared in Example 1 containing the negative-charging zinc oxide was compounded with polyvinyl alcohol as follows:

The use of polyvinyl alcohol in the coating compositions increases somewhat the tendency for the coating composition to foam. This is particularly true at low polyvinyl alcohol dosages. This problem may be at least partially eliminated by the use of standard defoamers, or by increasing the concentration of polyvinyl alcohol in the system. In general, the polyvinyl alcohol content of the coating composition should not exceed about 3% by weight. When the preferred high viscosity polyvinyl alcohols are employed, the preferred amount of alcohol is in the range of 0.25% to 1.5% by weight of resin binder.

It was originally thought that the addition of a number of water-soluble polymeric colloidal materials such as polyvinyl alcohol might prove useful in the reduction of toner background. Surprisingly, however, attempts to use materials such as hydroxypropyl methyl cellulose, sodium carboxy methyl cellulose and hydroxy ethyl cellulose have not met with significant success. There appears to be some unexplained interaction between the polyvinyl alcohol and the soap-free butadiene-styrene interpolymer latex which provides the desirable latex coating composition.

While the invention has been described specifically with respect to butadiene-styrene-shellac interpolymers, the binding resin may be any of the soap-free aqueous latices normally found useful for the coating of papers for electrostatic duplication use, including those described earlier herein. With these systems, the method of introducing the zinc oxide and polyvinyl alcohol into the coating composition and the methods of applying the coating composition are essentially the same as described above.

USE OF BI-CHARGING ZINC OXIDE AND POLYVINYL ALCOHOL

The invention is of particular significance when the coating composition includes both the bi-charge zinc oxide and polyvinyl alcohol. The following is an example of this particularly superior practice of the present invention:

EXAMPLE 18

Example 3 can be repeated with the additional inclusion of 1.0% polyvinyl alcohol (high viscosity, 99–100% hydrolysis) in the coating mixture to provide a coated paper having a charge acceptance of 275 volts, light decay of 14 seconds, and a time to 20 volts of 11 seconds. Prints made on such paper exhibit reduced toner background (even over Example 3) and contrast is improved still further.

Thus, the particularly outstanding practice of the present invention involves the use of an aqueous latex having dispersed therein a pigmentary mixture comprising about 25% by weight up to about 75% by weight of bi-charging zinc oxide with the balance negatively-charging zinc oxide and also having dispersed therein from about 0.25% to about 3% by weight based on resin solids of polyvinyl alcohol. In particular, the proportion of polyvinyl alcohol should be 0.25% up to about 1.5% by weight based on resin solids of a high viscosity polyvinyl alcohol. When such a coating composition is applied to a suitable substrate such as paper, the resulting coated substrate is consistently of high quality for electrostatic duplication processes of the type discussed herein. The particularly superior proportions and types of zinc oxide mixture and of polyvinyl alcohol disccussed above are particularly valuable when combined in the single coating composition.

What is claimed is:

1. An article of manufacture comprising a substrate for electrostatic duplication processes coated with a resin binder having dispersed therein a pigment mixture, the pigment-to-resin weight ratio being about 1:1 to about 10:1, said pigment mixture comprising about 25% to about 75% bi-charging zinc oxide, balance negative-charging zinc oxide, and the resin binder being selected from the group consisting of silicone resins, polystyrene, and butadiene copolymers, wherein the resin binder further contains from 0.25% to 1.5%, based on the weight of resin binder, of polyvinyl alcohol.

2. An article of manufacture in accordance with claim 1 wherein said substrate is paper, wherein said resin is a soap-free, predominantly styrene interpolymer of styrene, butadiene and shellac.

3. An article in accordance with claim 2 wherein the bi-charging and negative-charging zinc oxides are in about equal proportions in the pigment mixture.

4. An article of manufacture according to claim 1 wherein the polyvinyl alcohol is high viscosity polyvinyl alcohol, and the bi-charging and negative charging zinc oxide are in about equal proportions in the pigment mixture.

References Cited
UNITED STATES PATENTS

| | | | |
|---|---|---|---|
| 2,993,787 | 7/1961 | Sugarman | 96—1 |
| 3,060,134 | 10/1962 | Elder et al. | 252—501 |
| 3,378,371 | 4/1968 | Jarvis | 96—1.8 |
| 3,394,001 | 7/1968 | Makino | 96—1.5 |
| 3,431,106 | 3/1969 | Mason et al. | 96—1.8 |

GEORGE F. LESMES, Primary Examiner

M. B. WITTENBERG, Assistant Examiner

U.S. Cl. X.R.

96—1.5; 252—501; 260—27